United States Patent [19]

Lott

[11] Patent Number: 4,871,449

[45] Date of Patent: Oct. 3, 1989

[54] CLARIFIER AND SCREW COMPACTOR LIQUID-SOLID SEPARATOR

[76] Inventor: W. Gerald Lott, 1857 Post Oak Park Dr., Houston, Tex.

[21] Appl. No.: 211,828

[22] Filed: Jun. 27, 1988

[51] Int. Cl.[4] .................... B01D 21/24; B01D 29/42
[52] U.S. Cl. ..................... 210/110; 210/134;
210/136; 210/207; 210/241; 210/298; 210/415;
210/519; 210/521; 210/524; 100/112; 100/117;
100/145
[58] Field of Search ............... 210/103, 110, 117, 119,
210/134, 202, 218, 241, 261, 298, 414, 417, 519,
524, 539, 540, 136, 521; 100/117, 145, 112

[56] References Cited

U.S. PATENT DOCUMENTS

| | | | |
|---|---|---|---|
| 196,259 | 10/1877 | Solvay | 210/539 |
| 689,440 | 12/1901 | Tuska | 210/415 |
| 1,071,917 | 9/1913 | Hendryx | 210/524 |
| 1,762,593 | 6/1930 | Schwarz | 210/540 |
| 3,135,193 | 6/1964 | Hunt | 210/415 |
| 3,695,173 | 10/1972 | Cox | 100/117 |
| 3,982,483 | 9/1976 | Bird et al. | 100/117 |
| 4,072,614 | 2/1978 | Harris | 210/521 |
| 4,117,776 | 10/1978 | Hunt | 100/117 |
| 4,165,283 | 8/1979 | Weber et al. | 210/298 |
| 4,260,488 | 4/1981 | Condolias | 210/202 |
| 4,585,551 | 4/1986 | Musselmann et al. | 210/415 |
| 4,802,978 | 2/1989 | Schmit et al. | 210/521 |

FOREIGN PATENT DOCUMENTS

| | | | |
|---|---|---|---|
| 612528 | 11/1960 | Italy | 100/117 |
| 625134 | 6/1949 | United Kingdom | 210/415 |
| 8705619 | 9/1987 | World Int. Prop. O. | 100/117 |

*Primary Examiner*—Peter Kruskoci
*Assistant Examiner*—Christopher Upton
*Attorney, Agent, or Firm*—J. Peppers

[57] ABSTRACT

Discloses transportable liquid clarifying and screw conveyor/compactor liquid-solid separator apparatus which includes a pressureable clarifier vessel portably mounted on a base with a top and sides converging to the bottom of the vessel for attachment to a sludge disposal apparatus. A sludge inlet enters the top of the vessel and extends to near the bottom of the vessel. An effluent discharge flow control valve is connected through a conduit in the top of the vessel to provide a designated back pressure within the vessel while controlling the discharge flow of effluent liquid from the vessel. The sludge disposal apparatus includes an elongated screw conveyor/compactor mounted at an angle and extending upwardly from the vessel bottom. The compactor housing is tapered to compact the sludge as the screw conveyor carries the sludge to a liquid extraction section. The liquid extraction section has a screen tapered to further compact the slurry while extracting liquid being forced out of the slurry. The liquid extractor section is formed of a tapered screw rotatable within a tapered screen body formed of longitudinally extending, circumferentially spaced apart ribs or bars with the circumferential spacing being the screen openings.

21 Claims, 2 Drawing Sheets

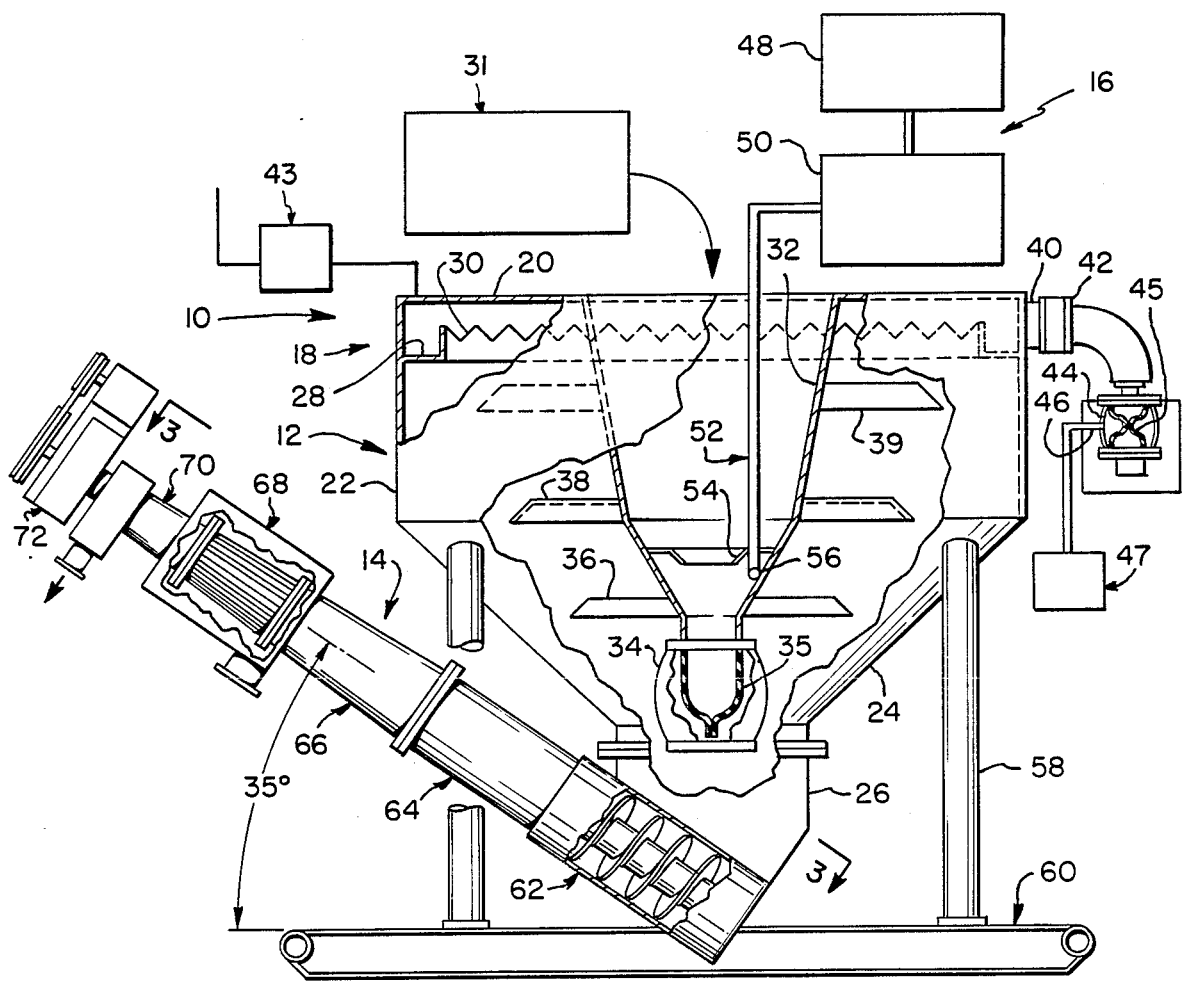
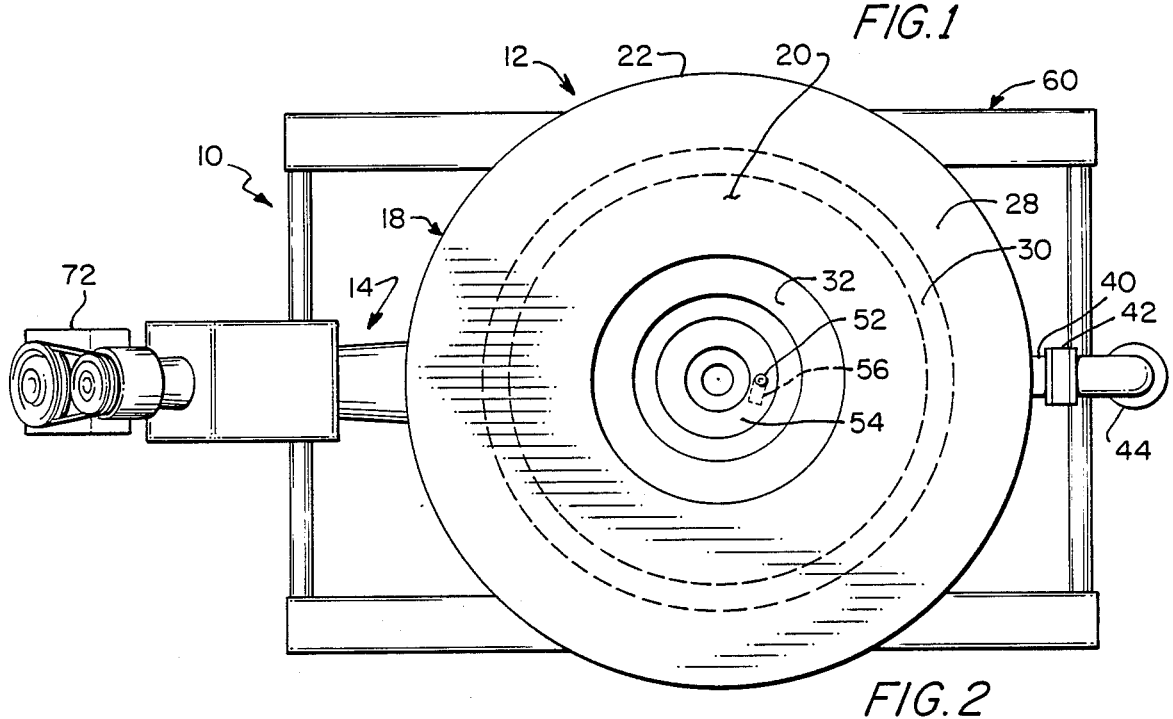
FIG.1
FIG.2

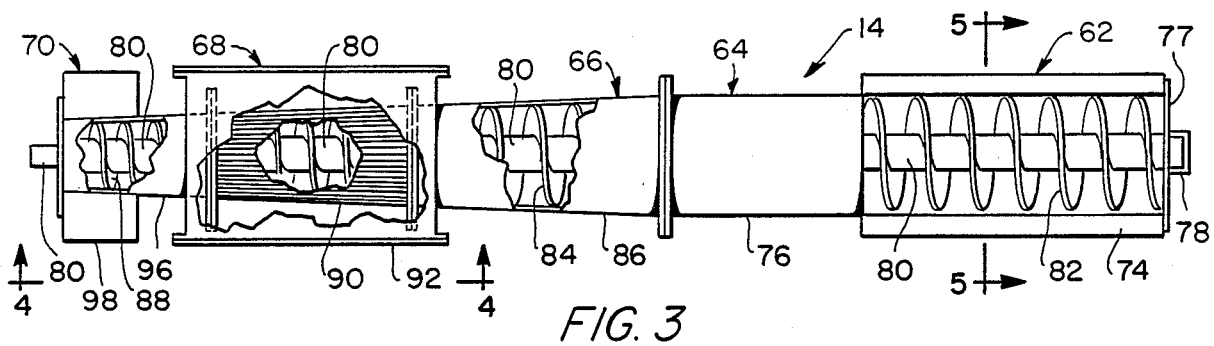
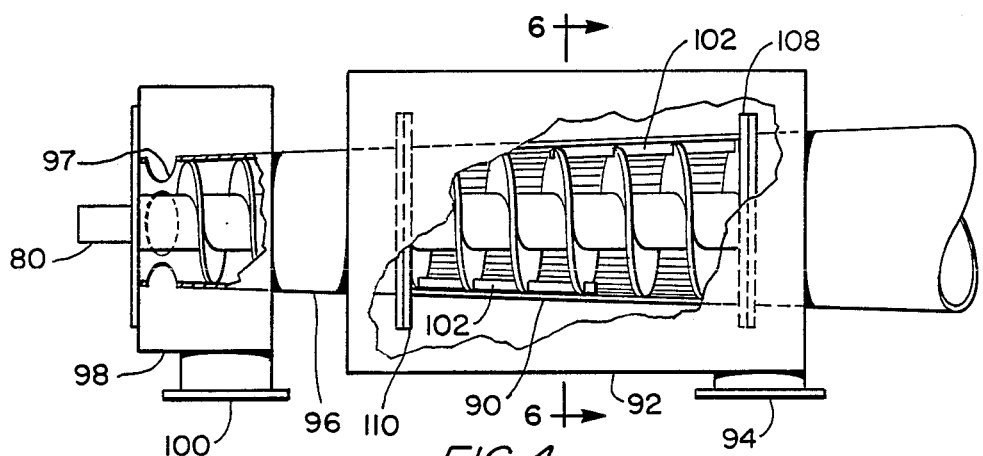
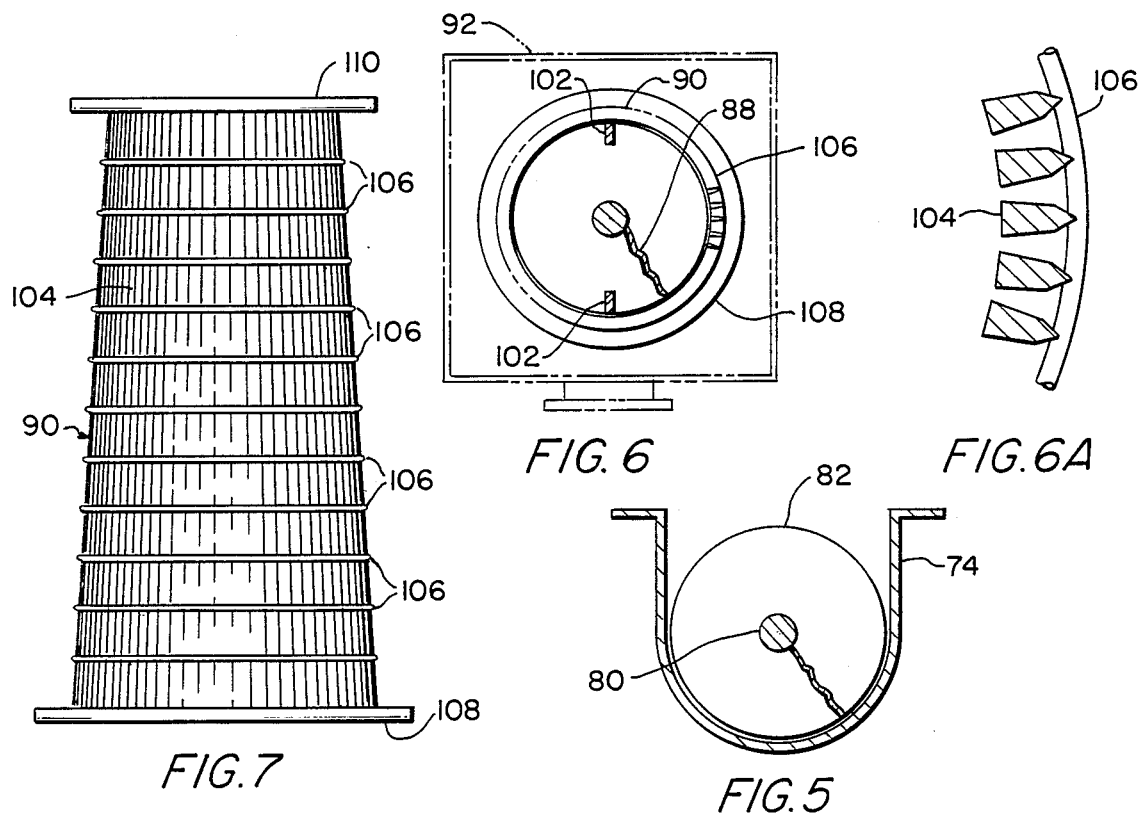

CLARIFIER AND SCREW COMPACTOR LIQUID-SOLID SEPARATOR

FIELD OF THE INVENTION

This invention generally relates to the separation of liquids from solids and more particularly pertains to apparatus for causing clarification of a liquid to form a liquid slurry or sludge and further for mechanically extracting a maximum amount of the liquid remaining in the sludge from the solids. For portability the apparatus may be integrally mounted on a moveable skid type base.

BACKGROUND OF THE INVENTION

There are many processes where a need exists to extract liquid from sludges, slurries, or the like. As examples, these processes are found in food processing, sewage disposal, oil well drilling mud recovery, brewing, paper making, mining, waste disposal and the like. In many applications the use of apparatus which is integral and which is portable or readily movable is advantageous or necessary.

The terms slurries, sludges, and sediments may be used interchangeably in this description. Also, the terms particles, bits and pieces may be used interchangeably herein to designate the solids either suspended or separated from liquid.

The presently known prior art consists of the following: U.S. Pat. No. 332,718 to Lafferty shows liquid extraction apparatus having a tapered screw rotatable within a tapered screen with the screen mounted in a slotted housing to drain squeezed out liquid. No. 3,176,606 to Zoffman shows an inclined screw and screen arrangement to extract beer wort from the hops leaves. No. 3,688,687 to Craig et al shows an inclined screw and screen arrangement to extract water from chopped trash. No. 3,768,171 to Bird et al shows a horizontal tapered screw rotatable in a tapered housing to remove water from rubber scraps. No. 4,214,377 to Maffet discloses a horizontal screw rotatable in a circumferentially slotted screen to extract water from sewage sludge or wood pulp chips. No. 3,426,677 to Combes et al discloses an inclined screw rotatable within a screen to extract water from a slurry of wet solids. No. 4,297,208 to Christian shows an inclined interrupted screw having drain openings along the shaft and being rotatable within a housing to extract water from a suspended slurry.

More comprehensive information concerning liquid-solid separation of the different kinds is available in the book by Svarovsky, Ladislav, "Solid-Liquid Separation" Butterworths, London, 1977, and in "Process Design Manual For Suspended Solids Removal", U.S. Environmental Protection Agency Technology Transfer, E.P.A. 625/1-75-003a, Washington, D.C., January 1975.

The tapered extractor screen described herein may be manufactured for this invention by Johnson Division, Signal Applied Technology, Inc., 1950 Old Highway 8, St. Paul, Minnesota 55164, for example and is of a type referred to under Johnson's trademark as a "Vee-Wire" screen.

The "Red Valve" valves provided herein may be provided as specified for example by Red Valve Company, Inc., 600 North Bell Avenue, Carnegie, Pennsylvania 15106.

The term portable apparatus, as used herein, means apparatus integrally mounted on a common skid type base and which can be loaded, transported, unloaded, and placed into service as an integral unit.

OBJECTS OF THE INVENTION

A principal object of this invention is to provide integral apparatus which will clarify a liquid and which will subsequently extract an optimum amount of the liquid from the resulting sludge, and discharge the sludge with a minimal amount of remaining liquid.

Another object of the present invention is to provide a screw conveyor/compactor apparatus including an improved liquid extraction screening apparatus for maximum removal or extraction of liquid from a sludge.

A further object of the present invention is to provide liquid clarifying apparatus having a pressure controlled liquid inlet and a pressure controlled liquid outlet for optimum clarification of the liquid and optimum precipitation of sludge.

SUMMARY OF THE INVENTION

The foregoing and other objects and advantages of the invention are obtained in a transportable liquid clarifying apparatus which includes a pressureable clarifier vessel portably mounted on a base with a top and sides converging to the bottom of the vessel for attachment to disposal apparatus. A sludge inlet enters the top of the vessel and extends to near the bottom of the vessel. A sludge entry flow check valve is connected to the sludge inlet and adapted to be opened at a designated pressure to admit sludge from the sludge inlet to within the vessel at the converged bottom of the vessel. A plurality of dispersion baffles are vertically mounted apart within the vessel to diverge the sludge passing upwardly in the vessel from the converged bottom of the vessel along the sides of the vessel. A notched flow weir is mounted near the top and around the periphery of the vessel to cause an even discharge of effluent liquid around the top periphery of the vessel. An effluent discharge flow control valve is connected through a conduit to the weir to provide a designated back pressure within the vessel while controlling the discharge flow of effluent liquid from the vessel. The sludge disposal apparatus includes an elongated screw conveyor/compactor mounted at an angle and extending upwardly from the source of sludge and including a rotatable screw conveyor shaft and a screw conveyor extending through the inside of the conveyor/compactor. A driving device is connected to the conveyor shaft 2 rotate the screw conveyor. A sludge receiving chute is mounted to receive the sludge with the screw conveyor means carrying the sludge upwardly to a connected sludge compactor housing. The compactor housing is tapered to compact the sludge and remove some liquid as the tapered screw conveyor carries the sludge to a liquid extraction section. The liquid extraction section has a screen tapered to further compact the slurry while extracting liquid being forced out of the slurry by the tapered screw conveyor as the slurry is being compacted. The liquid extraction section includes a drainage housing to collect and carry off the liquid. The screw conveyor carries the sludge on to a tapered sludge disposal housing where the sludge is further compacted and passed out of the apparatus. The clarifier may include a liquid flocculating means including a flocculent supply, a mixing and injection device, a conduit extending from the flocculation device into the clarifier vessel, and a nozzle arrangement to disperse the flocculent into the slurry near the inlet check valve. The flow control element of the check valve is formed as a resilient open tube extending into a preformed closed shape at the discharge end which requires a designated inlet pressure to open the flattened shape and permit liquid flow. The effluent discharge flow control valve is a resilient open tube forming a pressureable chamber within the housing of the valve and around the tube. The tube is adapted to contract to a designated flow area through the valve responsive to a designated control pressure impressed within the chamber. The liquid extractor section is formed of a tapered screw rotatable within a tapered screen body formed of longitudinally extending, circumferentially spaced apart ribs or bars with the circumferential spacing being the screen openings. The tapered screw carries wiper blades mounted longitudinally along the length of the screened body to wipe off any sludge particles tending to be lodged in the spaces between the ribs. The sludge is compacted with some water extraction by the combination of the reduced area of a tapered screw section along with a decrease in pitch of the screw conveyor through the compacting section.

BRIEF DESCRIPTION OF THE DRAWINGS

FIG. 1 is a semi-schematic, partly sectional, side elevational view showing a liquid-solid slurry separation system including a liquid clarifier structure connected into a screw compactor/conveyor apparatus below the structure and arranged to receive slurry from a slurry source and, optionally, a flocculating agent from a flocculent injection source;

FIG. 2 is a plan view of the apparatus of FIG. 1;

FIG. 3 is a view taken along the line 3—3 in FIG. 1 and showing the screw conveyor/compactor apparatus in more detail;

FIG. 4 is a view taken along the line 4—4 in FIG. 3 and showing the liquid extraction and solids disposal sections of the screw conveyor/compactor apparatus in more detail;

FIG. 5 is a view taken along the line 5—5 of FIG. 3 and showing the slurry receiving chute section of the screw compactor in more detail;

FIG. 6 is a cross-sectional view taken along the line 6—6 of FIG. 4 and showing the wiper blades and the screening bars of the liquid extraction section in more detail;

FIG. 6A is an enlarged view of a portion of FIG. 6; and

FIG. 7 is a side elevational view of the extraction screen apparatus shown in FIGS. 3, 4, 6 and 6A and schematically illustrating the entire screen as fabricated for assembly.

DESCRIPTION OF THE PREFERRED EMBODIMENTS

Referring first to FIGS. 1 and 2, there is illustrated the liquid clarifier/screw compactor separator system 10 of the present invention which includes a clarifier structure 12 and a screw conveyor/compactor structure 14. Also shown is a flocculent injector system 16 which may be incorporated as needed.

The clarifier 12 includes an enclosed pressureable vessel 18 having an annular top 20, a cylindrical upper side wall 22, and a conical lower side wall 24. The conical side wall 24 is connected as by flanges to a converging adaptor hopper 26. The hopper 26 is connected into the screw compactor 14 as later described.

An annular discharge trough 28 is defined around the top of the pressure vessel 18 with part of the trough 28 being formed of an effluent discharge weir 30. As shown weir 30 is notched to provide a multitude of discharge passages to cause the liquid rising up to flow over weir 30 to be substantially evenly distributed all around the weir 30 and thus cause an even upward flow from the bottom of the vessel 18 along the diverging sides of the side wall 24.

Centrally located within the vessel 18 is a generally conical liquid sludge inlet 32 which terminates at its lower end with a sludge inlet check valve 34 having an elastomer valve element 35. Sludge inlet 32 may be connected to the annular top 20 as shown.

Mounted around the exterior of sludge inlet 32 are a dispersion baffle 36, a dispersion baffle 38 and a dispersion baffle 39. As shown, these three dispersion baffles are shaped in the form of inverted saucers such that sludge accumulating on top of the baffles tends to slough off at the outer edges and fall to the bottom of the vessel 18. As shown, the baffles 36, 38 and 39 are of increasing diameter to guide the rising liquid to near the walls.

Mounted at the top of vessel 18 in flow communication with the trough 28 is an effluent discharge outlet 40. Connected to the discharge outlet 40 is a butterfly stop valve 42 and subsequently connected to valve 42 is a back pressure throttling valve 44. As shown, the throttling valve 44 has a tubular elastomer valve element 45, and the valve 44 has a side outlet where a control air conduit 46 is connected to communicate into the chamber formed between the valve element 45 and the housing of the valve 44.

A conventional degassing valve 43 is mounted at the top of vessel 18 in the annular top 20 as shown. The degassing valve 43 is provided when the liquid coming into inlet 32 contains entrained or dissolved gases which come out of the liquid during its quiescence in the vessel 18. If the gas is harmless it is simply vented to atmosphere to remove it from interfering with the operation of clarifier structure 12. If the gas is noxious it is vented into an appropriate gas disposal system (not shown).

One type of degassing valve suitable for valve 43 is float operated. This type valve has a float mounted within a chamber and connected to actuate a valve element. When the chamber is filled with liquid the float is positioned upwardly in the chamber to hold the valve element closed. As gas is accumulated in the chamber from vessel 18, the liquid is displaced and the float descends to a lower position and thereby opens the valve element to permit the gas to be vented.

A conventional flocculent injector system 16 may optionally be used as later described and includes a flocculent reservoir 48, a mixing and injection apparatus 50, and a flocculent injection conduit 52 which, as shown, extends down inside the sludge inlet 32 and extends through an internal baffle 54 mounted within the inlet 32. The terminal end of the conduit 52 is connected into a mixing nozzle 56 which is tangentially mounted to swirl the injection liquid around the side wall of the sludge inlet 32 underneath the baffle 54. The swirled injected flocculent is mixed in with the descending slurry which comes through the baffle 54 to be admitted into the vessel 18 through the valve 34.

The vessel 18 is supported in the position shown on four support posts 58 which in turn are mounted onto a skid structure 60. Lateral bracing (not shown) may be used if necessary to laterally support the vessel 18 with respect to the skid base 60.

As perspective to the apparatus as described, the vessel 18 may be 8 feet in diameter with the overall unit as shown in FIG. 1 being about 15 feet in overall length and 9 feet in height from the top of the vessel 8 to the bottom of skid 60. The screw compactor assembly as shown in FIG. 1 is mounted at about 35 degrees with respect to the horizontal and is about 12 feet in total length.

The valve 34 as provided is designed to require a designated pressure of a slurry liquid in the inlet 32 above the pressure of the liquid in the vessel 18 at the bottom of the valve 34. Such designated pressure may be 18 inches of water, for example.

The flow control element 35 of the check valve 34 is formed as a resilient open tube extending into a preformed flattened and closed shape at its discharge end whereby the flow pressure coming into the valve from the inlet 32 spreads the lips of the tube 35 only sufficiently to admit fluid so long as the 18 inches predesignated differential pressure is maintained.

The valve 34 may be a "Red Valve" series "T-2" in 8 inch size as manufactured by the Red Valve Company, previously identified.

The back pressure throttling valve 44 includes the elastomer valve element 45 with the elastomer control element being a resilient open tube forming a pressureable chamber within the housing of the valve 44 and around the tubular valve element. The tube 45 will contract in internal flow area to a designated area of flow through the valve 44 responsive to air or hydraulic pressure applied into the chamber defined around the element 45 and within the housing of the valve 44. This control pressure is supplied through the conduit 46 from a conventional pressure controller 47. Controller 47 may be of conventional air or hydraulic type.

The flow area of the valve element 45 is adjusted to provide a small back pressure in the liquid confined within the vessel 18 between the valve 44 and the check valve 34. This back pressure may be in the order of 2-23 feet of water, for example, and tends to exert a fluid pressure on the sludge formed in the bottom of the vessel 18 and the adapter hopper 26 leading into the screw conveyor structure 14. As required by additional operating pressure, the vessel 18 may be provided with a domed top 20 rather than the flat top 20 shown in FIG. 1.

The valve 44 may be also a "Red Valve" such as the air operated type "A" in the 6 inch size as supplied by the Red Valve Company, for example.

It is to be noted that the back pressure created in the vessel 18 by the throttling valve 44 is accumulative to the pressure in the slurry inlet 32 which is needed to open the valve 35 and permit entry of slurry into the vessel 18. Thus when the supply of slurry to the inlet 32 from the slurry source 31 is stopped, then slurry passage through the valve 34 is stopped and the valve 44 closes off to maintain the back pressure as previously described. Consequently, there is no further circulation through the vessel 18 until the flow of slurry is resumed from the slurry source 31.

Referring now to FIGS. 3–7, the screw conveyor/compactor 14 is illustrated in greater detail. The compactor/conveyor 14 is seen to include a receiving chute section 62 connected as by flange connection to the adapter hopper 26, a transport section 64 connected to the chute section 62, a compactor section 66 connected to transport section 64, an extraction section 68 connected to the compactor section 66, and a disposal section 70 connected to the extraction section 68.

A conventional screw drive device 72 is connected to a drive shaft 80 at the end of the disposal section 70. The drive section 72 includes a hydraulic drive motor and a gear box connected by belt or chain to the drive motor. The drive motor is powered by a source of hydraulic pressure (not shown) and is of conventional construction. The screw drive shaft 80 extends through the entire structure 14 and drives a plurality of screw conveyors as later described.

The chute section 62 includes a receiving chute 74 which has an enclosure 77 and a bearing journal 78 receiving the drive shaft 80. The chute 74 is connected to the adaptor hopper 26 as previously described and houses a uniform OD conveyor screw 82 connected to the shaft 80. This conveyor screw 82 may be 5 feet in length with a 4 inch pitch, for example. The screw conveyor 82 also extends through the transport housing 76 of the transport section 64.

The transport section 64 is in flanged connection with the tapered housing 86 of the compactor section 66 and encloses a tapered down compactor screw 84 which is also connected to the drive shaft 80. The compactor screw may be 2 feet 6 inches long and have a 3 inch pitch, for example.

The extraction section 68 and the disposal section 70 may employ the same tapered down extractor screw 88 which may be about 3 feet long and have a 2 inch pitch, for example. The tapered screw 88 extends through extraction section 68 which is a ribbed structure 90 connected to compactor section 68 and disposal section 70 by means of flanges 110 and 108. The extraction section 68 includes a extractor drain housing 92 having a liquid outlet 94 shown in FIGS. 1 and 4.

The disposal section 70 includes disposal outlet holes 97 and also a section of the tapered screw 88. Housing 96 also includes a disposal housing 98 through which extends the shaft 80 for connection to the driver unit 72. The housing 98 includes a solids outlet 100 as shown in FIGS. 1 and 4.

Extraction section 68 is shown in more detail in FIGS. 4, 6, 6A and 7. As shown, the section of screw 88 which extends through the compactor section 68 is equipped with wiper blades or scraper blades 102 which wipe against the interior of a screen body 90 having an arrangement of wedge shaped ribs or wires 104 which are retained in position by retainer rings or bars 106, best shown in FIG. 6A. The arrangement and spacing of the ribs 104 constitute a longitudinally extending extractor screen 90 such as shown in FIG. 7 and the spaces between adjacent bars 104 constitute the screen flow passages of the screen 90.

The extractor 90 may be manufactured by the Johnson Division as previously identified, and may be termed a "Vee-Wire" screen as desired. Exemplary dimensions for each of the ribs 104 of the extraction section 90 are 0.390 inches for the radial dimension and 0.191 inches for the chordal width at the interior of the rib. The included relief angle of each rib may be 10 degrees. The ribs may be spaced apart 0.012 inches for the flow clearance between each adjacent rib 104.

As seen in FIG. 1, the extraction section 68 is placed at about a 35 degree inclination and any slurries coming up through the extraction unit from the receiving chute will start to drain water at the lower and large end of the screen 90 and progress as need be up through the height of the screen 90 as the screw conveyor 88 conveys it along.

As the power unit 72 rotates the shaft 80, all the conveyor screws 82, 84 and 88 are jointly rotated. Slurry coming into the receiving section 62 is brought by rotation of the screws up through the transport section 64 and the compactor section 66 into the extraction section 68 wherein all excess liquid is squeezed and drained out of the slurry contained within the screen 90 before it is transferred through the disposal section 70 and out through the discharge outlet 100. Some liquid is squeezed out of the sludge by the compactor section 66 which escapes through the clearance between housing 86 and screw 84.

It is to be noted that the overall separating system 10 as shown has a width and height permitting the unit to be loaded onto a truck trailer and transported over public highways to the site where it is to be used. The unit 10 is located conveniently to a slurry source 31 and the skid 60 is leveled appropriately so that the overflow weir 30 is commensurately level in order to function properly. The power unit 72 is connected to a source of hydraulic power supply and the pressure controller 47 is connected to an air or hydraulic pressure supply. The installation is such that the slurry source 31 may discharge a liquid-solid mixture into the inlet 32 of the vessel 18.

Depending on the nature of the liquid to be treated by the unit 10, the conventional flocculent injector system 16 may or may not be employed. When the injector system 16 is used, it is connected so that the injection conduit 52 is extended down to the mixing nozzle 56, whereby the flocculent is injected in a swirling action around the inlet 32 beneath the baffle 54. Since the swirling flocculent will have a tendency to rise and the slurry from the source 31 is descending toward the valve 34, a mixing action takes place to mix the flocculent in with the incoming slurry.

The incoming liquid slurry opens the valve member 35 at a prescribed pressure and permits the liquid to go into the bottom of the vessel 18 whereupon it will begin to rise all around the diverging walls of the walls 24 and up the sides 22 of the vessel 18. This flow is sufficiently slow that the sludge and heavier particles of the liquid will settle down into the adapter hopper 26 and on into the chute 74. When used, the flocculent from the injection system 16 tends to flocculate such particles together for more positive and rapid settlement. The gradually clarifying liquid is brought up to the top of the vessel 18 where it will flow over the notches of the weir 30 into the trough 28.

The clarified liquid flowing into trough 28 flows out of the effluent discharge conduit 40 and the stop valve 42 to the valve 44. The pressure control 47 impresses air or hydraulic pressure through the conduit 46 into the plenum between the valve 44 and the valve element 45 such that a designated pressure is required from the liquid coming through the outlet 40 to open the valve 44. Once this pressure is established, the flow discharge of clarified liquid from the vessel 18 passes through the valve 44 into a suitable receptacle for further use or disposal.

The sludge or slurry which is settled out of the clarified liquid in the vessel 18 descends by gravity and, to some extent, by the pressure in the vessel 18 into the receiving chute 74 of the screw compactor section 14. There the sludge is picked up by the screw conveyer 82 and passed through the receiving section 62, the transport section 64 and the compactor section 66 to the extraction section 68. In compactor section 66, the tapered housing 76 and the tapered screw 84 causes the sludge within this section to compact and to be carried forward into the extraction section 68. Sufficient clearance is provided between the screw 84 and the housing 86 to permit some of the liquid squeezed out by the compacting section 66 to be passed back downwardly through the housing 86 and transport housing 76 toward the chute 74, or upwardly into extractor section 68.

The compacted sludge is passed from the compactor section 66 into the extraction section 68. Here, the extractor screen 90 is also tapered to conform to the tapered screw conveyor 88 which further compacts the sludge as it is moved upwardly along the inclined path of the screw conveyor. Virtually all the excess liquid is squeezed out of the sludge through the flow clearances between the bars 104 of the screen 90 as the sludge is conveyed through the length of the screen 90.

The particulates, containing very little liquid of the original sludge, are conveyed through the disposal section 70 and out of the holes 97 in the disposal housing 96 where such particles are discharged through the disposal discharge outlet 100.

The spaces between the ribs 104 of the extractor screen 90 are kept substantially open by rotation of the wiper blades 102 as the screw 88 is rotated by the shaft 80. The liquid extracted by the extraction section 68 may be returned to the liquid incoming to the sludge inlet 32 from the source 31 for further processing as desired. The particulates discharged at the disposal outlet 100 may be emptied into a transportable receptacle to be periodically transported away and emptied as desired.

The method and apparatus of this invention has been described with respect to the preferred embodiment as herein disclosed. It is to be understood, however, that modifications and changes may be made to the invention by those skilled in the art without departing from the spirit and purview of the invention as specified and claimed in the appended claims:

What is claimed is:

1. Transportable liquid clarifying and liquid-solids separation apparatus comprising:
   (a) a pressurable clarifier vessel portably mounted on a skid type base with a top and sides converging at a bottom of said vessel for attachment to a screw conveyor/compactor;
   (b) a liquid inlet entering said vessel and extending to near said bottom of said vessel;
   (c) an entry flow check valve means connected to said liquid inlet and constructed and configured for opening at a designated pressure to admit liquid from said liquid inlet to within said vessel at the converged bottom of said vessel;
   (d) a plurality of dispersion baffles vertically mounted apart within said vessel to diverge liquid passing upwardly within said vessel from the converged bottom of the vessel out along the peripheral sides of said vessel;
   (e) a notched flow weir means connected near the top and around the periphery of said vessel to cause an even discharge of effluent liquid around the top periphery of said vessel;
   (f) a pressure responsive effluent discharge flow control valve means connected through a conduit to said weir means to provide a designated back pressure within said vessel while controlling the discharge flow of effluent liquid from said vessel;

(g) a screw conveyor/compactor being connected to receive sludge at the bottom of said vessel and including a rotatable drive shaft and a screw conveyor means extending upwardly through the interior of said conveyor/compactor;

(h) a sludge receiving chute and housing means mounted to receive a sludge with said screw conveyor means carrying said sludge upwardly to a connected sludge compactor housing;

(i) a compactor housing being tapered to compact said sludge as said screw conveyor means carries said sludge to a liquid extracting means;

(j) a liquid extraction means having a tapered and longitudinally slotted screen to further compact said slurry while extracting liquid being forced out of said slurry as said slurry is being further compacted by said screw conveyor means;

(k) said liquid extraction means including drainage means to collect and carry off said liquid; and (l) said screw conveyor means carrying said sludge farther to a sludge disposal means where said sludge is further compacted and passed out of said apparatus.

2. The apparatus of claim 1 further comprising liquid flocculation means including a flocculant supply, mixing and injection means, a conduit extending from said flocculation means into said clarifier vessel, and means to disperse and mix the flocculant into said slurry.

3. The apparatus of claim 1 wherein a flow control element of said check valve means is formed as a resilient open tube extending into a preformed, flattened closed shape at its discharge end which requires a designated inlet pressure to open said flattened shape to liquid flow.

4. The apparatus of claim 3 further comprising means to control said designated inlet pressure to about 18" of water.

5. The apparatus of claim 1 wherein a flow control element of said flow control valve means is a resilient open tube connected within a housing of said valve means to form a pressurable chamber around said tube, said tube being adapted to contract to a designated flow area through said valve in response to a designated control pressure impressed within said chamber.

6. The apparatus of claim 5 further comprising means to control said designated control pressure to cause more than about 2 feet of water pressure within said vessel.

7. The apparatus of claim 1 wherein a flow control element of said check valve means if formed as a first resilient open tube extending into a preformed flattened closed at its discharge end which requires a designated inlet pressure to open said flattened shape to liquid flow, and wherein the flow control element of said flow control valve is a second resilient open tube forming a pressurable chamber connected within a housing of said valve means to form a pressurable chamber around said tube, said second tube being adapted to contract to a designated flow area for flow through said valve in response to a designated control pressure impressed within said chamber.

8. The apparatus of claim 1 wherein said liquid extraction means is formed of said tapered screw conveyor means rotatable within a tapered screen body formed of longitudinally extending, circumferentially spaced apart bars disposed at a selected spacing to form the screen openings, said tapered screw conveyor means carrying at least one blade mounted longitudinally along the length of said screen body to wipe off any sludge particles tending to become lodged in spaces between said bars.

9. The apparatus of claim 1 wherein the spaces between said spaced apart bars are about 0.12 inch.

10. Transportable liquid clarifying and liquid-solids separation apparatus comprising:

(a) a pressurable clarifier vessel portably mounted on a skid type base with a top and sides converging at the bottom of said vessel for attachment to a sludge disposal apparatus;

(b) a liquid inlet entering liquid to near the bottom of said vessel;

(c) a liquid entry flow check valve means connected to said liquid inlet and constructed and configured for opening at a designated pressure to admit liquid from said liquid inlet to within said vessel at the converged bottom of said vessel;

(d) a plurality of dispersion baffles vertically mounted apart within said vessel to diverge liquid passing upwardly within said vessel to out from the converged bottom of said vessel to out along the peripheral sides of said vessel;

(e) a notched flow weir means mounted near the top and around the periphery of said vessel to cause an even discharge of effluent liquid around the top periphery of said vessel; and (f) a pressure responsive effluent discharge flow control valve means connected through a conduit to said weir means for providing a designated back pressure within said vessel while controlling the discharge flow of effluent liquid from said vessel.

11. The apparatus of claim 10 further comprising a liquid flocculation means including a flocculation supply, mixing and injection means, a conduit extending from said flocculation means into said clarifier vessel, and means to disperse and mix the flocculant into said slurry near said check valve means.

12. The apparatus of claim 10 wherein the flow control element of said check valve means is formed as a resilient open tube extending into a preformed flattened closed shape at its discharge end which requires a designated inlet pressure to open said flattened shape to allow liquid flow.

13. The apparatus of claim 12 further comprising means to control said designated inlet pressure to a pressure designated in inches of water.

14. The apparatus of claim 10 wherein a flow control element of said flow control valve means is a resilient open tube connected within a housing of said valve means to form a pressurable chamber around said tube, said tube being adapted to contract to a designated flow area through said valve in response to a designated control pressure impressed within said chamber.

15. The apparatus of claim 14 further comprising means to control said designated control pressure to cause a designated pressure within said vessel.

16. Transportable liquid clarifying and liquid-solids separation apparatus comprising:

(a) a pressurable clarifier vessel portably mounted on a skid type base with a top and sides converging at a bottom of said vessel for attachment to a screw conveyor/compactor;

(b) a liquid inlet entering the top of said vessel and extending to near the bottom of said vessel;

(c) an entry flow check valve means connected to said liquid inlet and constructed and configured for opening at a designated pressure to admit liquid from said liquid inlet to within said vessel at the converged bottom of said vessel;

(d) a plurality of dispersion baffles vertically mounted apart within said vessel to diverge the liquid passing upwardly within said vessel from the converged bottom of the vessel out along the peripheral sides of said vessel;

(e) a notched flow weir means mounted near the top and around the periphery of said vessel to cause an even discharge of effluent liquid around the top periphery of said vessel;

(f) a pressure responsive effluent discharge flow control valve means connected through a conduit to said weir means to provide a designated back pressure within said vessel while controlling the discharge flow of effluent liquid from said vessel; and (g) a screw conveyor/compactor being connected to receive sludge at the bottom of said vessel and including a rotatable drive shaft and a screw conveyor means extending upwardly through the interior of said conveyor/compactor.

17. The apparatus of claim 16 further comprising liquid flocculation means including a flocculent supply, mixing and injection means, a conduit extending from said flocculation means into said clarifier vessel, and means to disperse and mix the flocculent into said slurry.

18. The apparatus of claim 16 wherein a flow control element of said check valve means is formed as a resilient open tube extending into a preformed flattened closed shape at its discharge end which requires a designated inlet pressure to open said flattened shape to liquid flow.

19. The apparatus of claim 16 wherein a flow control element of said flow control valve means is a resilient open tube connected within a housing of said valve means to form a pressurable chamber around said tube, said tube being adapted to contract to a designated flow area or flow through said valve in response to a designated control pressure impressed within said chamber.

20. The apparatus of claim 16 wherein a flow control element of said check valve means is formed as a first resilient open tube extending into a preformed flattened closed shape at its discharge end which requires a designated inlet pressure to open said flattened shape to liquid flow, and wherein the flow control element of said flow control valve is a second resilient open tube connected within a housing of said valve means to form a pressurable chamber around said tube, said second tube being adapted to contract to a designated flow area for flow through said valve in response to a designated control pressure impressed within said chamber.

21. Apparatus for extracting liquid from the solids of a sludge comprising:

(a) an upwardly inclined apparatus housing including a sludge receiving chute connected into the inlet of a lower cylindrical screw conveyor housing, an intermediate tapered compactor housing having a large lower inlet connected to the outlet of said conveyor housing, and an upper tapered liquid extracter housing having a larger lower end connected to a smaller end of said compactor housing;

(b) a screw conveyor element extending through said apparatus housing and fitting respectively within said conveyor housing, said compactor housing, and said extracter housing;

(c) said screw conveyor element being connected to a rotatable conveyor shaft for rotation of said conveyor element within said apparatus housing;

(d) said conveyor element being operable to receive sludge through said inlet chute and to move said sludge through said apparatus housing when said conveyor element is rotated;

(e) said compactor housing and said extracter housing being constructed and configured to compact and extract liquid from said sludge;

(f) said compactor housing being constructed and configured to allow liquid to escape through a clearance between said compactor housing and said screw conveyor, and said extracter housing having a plurality of screen ribs mounted longitudinally and spaced apart to form a longitudinal screen between the inlet and the outlet of said extracter housing; and (g) at least one straight wiper blade connected to said screw conveyor element along the length of said extracter housing and loosely adjacent within and along the length of said screen ribs for wiping off sludge particles tending to become lodged in the spacing between said screen ribs.

* * * * *